US012664448B2

(12) United States Patent
Bhattacharjya et al.

(10) Patent No.: US 12,664,448 B2
(45) Date of Patent: Jun. 23, 2026

(54) AVERAGE TREATMENT EFFECT FOR PAIRED DATA

(71) Applicant: International Business Machines Corporation, Armonk, NY (US)

(72) Inventors: Debarun Bhattacharjya, New York, NY (US); Dharmashankar Subramanian, White Plains, NY (US); Tian Gao, Berkeley Heights, NJ (US); Nicholas Scott Mattei, New Orleans, LA (US)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 17/386,719

(22) Filed: Jul. 28, 2021

(65) Prior Publication Data

US 2023/0044347 A1      Feb. 9, 2023

(51) Int. Cl.
*G06N 5/046* (2023.01)
*G06F 18/21* (2023.01)
(Continued)

(52) U.S. Cl.
CPC ......... *G06N 5/046* (2013.01); *G06F 18/2134* (2023.01); *G06F 18/2193* (2023.01); *G06F 18/22* (2023.01)

(58) Field of Classification Search
CPC ........ G06N 5/046; G06N 5/022; G06N 5/041; G06N 5/01; G06F 18/2134; G06F 18/2193; G06F 18/22
See application file for complete search history.

(56) References Cited

U.S. PATENT DOCUMENTS 8,793,715 B1      7/2014  Weitzenfeld
11,354,566 B1 *   6/2022  Chen ...................... G06N 3/002
(Continued)

FOREIGN PATENT DOCUMENTS

CN      103081403 A      5/2013
CN      103119607 A      5/2013
(Continued)

OTHER PUBLICATIONS

Bhattacharjya et al., "Proximal Graphical Event Models", 32nd Conference on Neural Information Processing Systems (NeurIPS 2018), Montréal, Canada, 10 pages.
(Continued)

*Primary Examiner* — KC Chen
(74) *Attorney, Agent, or Firm* — Gavin Giraud

(57) ABSTRACT

Embodiments of the present invention provide computer-implemented methods, computer program products and computer systems. Embodiments of the present invention can, identify a plurality of data variables within a multivariate event dataset. Embodiments of the present invention can then formalize a causal inference between at least two identified data variables within the multivariate event dataset and generate a structural framework of an average effect value for the multivariate event dataset based on the formalization of the causal inference of the identified data variables. Embodiments of the present invention can then calculate an inverse propensity score for the generated structural framework of the average effect based on a type of identified variable, a predetermined time associated with the identified variable, and a causal connection strength between the identified variables.

20 Claims, 5 Drawing Sheets

302

| Model | Window Size | CI | CI_M | IP-NW | IP-NS | IP-Stable |
|---|---|---|---|---|---|---|
| PGEM-1 | 10 | 0.47±0.15 | 0.46±0.13 | 1.72±1.47 | 2.66±2.09 | 0.33±0.10 |
| | 20 | 1.47±0.88 | 1.32±0.54 | 1.19±0.65 | 22.8±6.82 | 0.57±0.18 |
| | 30 | 1.84±0.72 | 1.65±0.77 | 0.57±0.46 | 54.5±12.2 | 0.59±0.21 |
| | 40 | 1.98±1.01 | 1.72±0.74 | 0.49±0.37 | 4.93±3.20 | 0.34±0.15 |
| | 60 | 2.01±1.09 | 1.81±0.82 | 0.50±0.37 | 0.71±0.22 | 0.31±0.14 |
| PGEM-2 | 10 | 0.50±0.12 | 0.50±0.11 | 1.85±2.76 | 1.54±1.79 | 0.42±0.19 |
| | 20 | 1.46±1.00 | 1.45±1.00 | 1.82±2.75 | 19.1±33.9 | 0.79±0.35 |
| | 30 | 2.11±1.80 | 2.08±1.78 | 1.59±1.81 | 24.5±11.3 | 1.07±0.37 |
| | 40 | 2.40±1.93 | 2.16±1.91 | 0.88±0.23 | 26.4±2.51 | 0.59±0.14 |
| | 60 | 2.58±2.02 | 2.33±1.97 | 0.54±0.19 | 0.48±0.25 | 0.31±0.13 |
| PGEM-3 | 10 | 0.55±0.15 | 0.55±0.14 | 2.34±0.83 | 1.20±0.59 | 0.36±0.13 |
| | 20 | 1.46±0.57 | 1.45±0.57 | 2.34±0.85 | 12.8±5.09 | 0.60±0.15 |
| | 30 | 2.04±0.97 | 2.00±1.02 | 1.89±0.62 | 95.8±10.5 | 1.08±0.15 |
| | 40 | 2.77±1.19 | 2.17±1.10 | 0.52±0.38 | 5.71±2.36 | 0.32±0.13 |
| | 60 | 2.81±1.262 | 2.21±1.14 | 0.53±0.38 | 0.64±0.35 | 0.31±0.13 |
| Hawkes-1 | 10 | 0.25±0.21 | 0.26±0.21 | 0.27±0.25 | 0.11±0.12 | 0.07±0.06 |
| | 15 | 0.33±0.24 | 0.34±0.23 | 0.27±0.25 | 0.11±0.11 | 0.05±0.06 |
| | 20 | 0.36±0.30 | 0.37±0.30 | 0.27±0.25 | 0.14±0.13 | 0.06±0.06 |
| | 30 | 0.42±0.35 | 0.43±0.35 | 0.27±0.25 | 0.19±0.11 | 0.06±0.06 |
| Hawkes-2 | 10 | 0.70±0.78 | 0.77±0.94 | 0.44±0.43 | 0.15±0.15 | 0.10±0.08 |
| | 15 | 0.83±0.92 | 0.88±1.13 | 0.44±0.44 | 0.16±0.17 | 0.10±0.09 |
| | 20 | 0.89±1.00 | 0.97±1.24 | 0.43±0.43 | 0.14±0.14 | 0.10±0.09 |
| | 30 | 0.96±1.11 | 1.07±1.23 | 0.43±0.44 | 0.17±0.17 | 0.10±0.10 |
| Hawkes-3 | 10 | 0.74±0.80 | 0.78±0.84 | 0.23±0.21 | 0.16±0.15 | 0.10±0.08 |
| | 15 | 0.87±0.92 | 1.00±1.04 | 0.23±0.21 | 0.15±0.16 | 0.09±0.09 |
| | 20 | 1.06±1.05 | 1.17±1.25 | 0.23±0.21 | 0.14±0.16 | 0.09±0.09 |
| | 30 | 1.10±1.19 | 1.21±1.51 | 0.23±0.21 | 0.16±0.16 | 0.09±0.09 |

(51) Int. Cl.
   *G06F 18/2134*        (2023.01)
   *G06F 18/22*          (2023.01)

(56)                References Cited

U.S. PATENT DOCUMENTS

| | | | |
|---|---|---|---|
| 11,443,225 | B2 | 9/2022 | Li et al. |
| 2012/0008819 | A1 | 1/2012 | Ding et al. |
| 2013/0144713 | A1 | 6/2013 | Anderson |
| 2014/0343959 | A1 | 11/2014 | Hasegawa et al. |
| 2016/0055320 | A1 | 2/2016 | Wang et al. |
| 2017/0140465 | A1 | 5/2017 | Stouse |
| 2020/0160189 | A1 | 5/2020 | Bhattacharjya et al. |
| 2020/0202382 | A1 | 6/2020 | Chen et al. |
| 2020/0257714 | A1* | 8/2020 | Grabovitch-Zuyev ..................... G06N 20/00 |
| 2021/0142910 | A1* | 5/2021 | Hafez ....................... G06N 5/01 |
| 2022/0094533 | A1* | 3/2022 | Sampaio ................... H04L 9/14 |
| 2023/0419184 | A1* | 12/2023 | Wick ..................... G06N 20/00 |

FOREIGN PATENT DOCUMENTS

| | | |
|---|---|---|
| CN | 108629418 A | 10/2018 |
| CN | 110741390 A | 1/2020 |
| CN | 111709225 A | 9/2020 |
| CN | 111709244 A | 9/2020 |
| CN | 115700610 A | 2/2023 |
| EP | 2589181 A1 | 5/2013 |
| JP | 2014-225177 A | 12/2014 |
| JP | 2023-021042 A | 2/2023 |
| WO | 2019103472 A1 | 5/2019 |

OTHER PUBLICATIONS

Didelez, Vanessa, "Graphical Models for Marked Point Processes based on Local Independence", Oct. 2005, 33 pages.

Du et al., "Recurrent Marked Temporal Point Processes: Embedding Event History to Vector", Aug. 13-17, 2016, 10 pages, <http://dx.doi.org/10.1145/2939672.2939875>+.

Gao et al., "Causal Inference for Event Pairs in Multivariate Point Processes", Copyright 2021, 11 pages.

Gunawardana et al., "Universal Models of Multivariate Temporal Point Processes (With Supplementary Appendix Containing Proofs)", Appearing in Proceedings of the 19th International Conference on Artificial Intelligence and Statistics (AISTATS) 2016, Cadiz, Spain, 12 pages.

Lee et al., "Private Causal Inference using Propensity Scores", arXiv:1905.12592v1 [cs.LG] May 29, 2019, 10 pages.

Lok, Judith J., "Statistical Modeling of Causal Effects in Continuous Time", 2008, vol. 36, No. 3, 1464-1507,< http://dx.doi.org/10.1214/009053607000000820>.

Mao et al., "On the propensity score weighting analysis with survival outcome: Estimands, estimation, and inference", Accepted: May 7, 2018, 19 pages, <https://doi.org/10.1002/sim.7839>.

Meek, Christopher, "Toward Learning Graphical and Causal Process Models", Uploaded Apr. 6, 2021, 6 pages.

Mei et al., "The Neural Hawkes Process: A Neurally Self-Modulating Multivariate Point Process", 31st Conference on Neural Information Processing Systems (NIPS 2017), 11 pages.

Rajaram et al., "Poisson Networks: A Model for Structured Point Processes", Uploaded Apr. 6, 2021, 8 pages.

Rosenbaum et al., "The Central Role of the Propensity Score in Observational Studies for Causal Effects", Biometrika, vol. 70, No. 1. (Apr. 1983), pp. 41-55, <http://links.jstor.org/sici?sici=0006-3444%28198304%2970%3A1%3C41%3ATCROTP%3E2.0.CO%3B2-Q>.

Rubin, Donald B., "Using Propensity Scores to Help Design Observational Studies: Application to the Tobacco Litigation", Accepted Dec. 19, 2001, 20 pages.

Simma et al., "CT-NOR: Representing and Reasoning About Events in Continuous Time", Microsoft Research, Uploaded Apr. 6, 2021, 10 pages.

Simma et al., "Modeling Events with Cascades of Poisson Processes", Uploaded Apr. 6, 2021, 10 pages.

Weiss et al., "Forest-Based Point Process for Event Prediction from Electronic Health Records", Uploaded Apr. 6, 2021, 16 pages.

Xiao et al., "Modeling The Intensity Function Of Point Process Via Recurrent Neural Networks", arXiv:1705.08982v1 [cs.LG] May 24, 2017, 8 pages.

Yang et al., "Semiparametric estimation of structural failure time model in continuous-time processes", Feb. 17, 2019, 26 pages, <http://arxiv.org/abs/1808.06408v2>.

Zhou et al., "Learning Triggering Kernels for Multi-dimensional Hawkes Processes", JMLR: W&CP vol. 28. Copyright 2013 by the author(s), 9 pages.

Japan Patent Office, "Notice of Reasons for Refusal" Nov. 4, 2025, 05 Pages, JP Application No. 2022-120133.

The State Intellectual Property Office of People's Republic of China, "First Office Action", Oct. 10, 2025, 10 Pages, CN Application No. 202210898425.3.

* cited by examiner

302

| Model | Window Size | CI | $CI_M$ | IP-NW | IP-NS | IP-Stable |
|---|---|---|---|---|---|---|
| PGEM-1 | 10 | 0.47±0.15 | 0.46±0.13 | 1.72±1.47 | 2.66±2.09 | 0.33±0.10 |
| | 20 | 1.47±0.88 | 1.32±0.54 | 1.19±0.65 | 22.8±6.82 | 0.57±0.18 |
| | 30 | 1.84±0.72 | 1.65±0.77 | 0.57±0.46 | 54.5±12.2 | 0.59±0.21 |
| | 40 | 1.98±1.01 | 1.72±0.74 | 0.49±0.37 | 4.93±3.20 | 0.34±0.15 |
| | 60 | 2.01±1.09 | 1.81±0.82 | 0.50±0.37 | 0.71±0.22 | 0.31±0.14 |
| PGEM-2 | 10 | 0.50±0.12 | 0.50±0.11 | 1.85±2.76 | 1.54±1.79 | 0.42±0.19 |
| | 20 | 1.46±1.00 | 1.45±1.00 | 1.82±2.75 | 19.1±33.9 | 0.79±0.35 |
| | 30 | 2.11±1.80 | 2.08±1.78 | 1.59±1.81 | 24.5±11.3 | 1.07±0.37 |
| | 40 | 2.40±1.93 | 2.16±1.91 | 0.88±0.23 | 26.4±2.51 | 0.59±0.14 |
| | 60 | 2.58±2.02 | 2.33±1.97 | 0.54±0.19 | 0.48±0.25 | 0.31±0.13 |
| PGEM-3 | 10 | 0.55±0.15 | 0.55±0.14 | 2.34±0.83 | 1.20±0.59 | 0.36±0.13 |
| | 20 | 1.46±0.57 | 1.45±0.57 | 2.34±0.85 | 12.8±5.09 | 0.60±0.15 |
| | 30 | 2.04±0.97 | 2.00±1.02 | 1.89±0.62 | 95.8±10.5 | 1.08±0.15 |
| | 40 | 2.77±1.19 | 2.17±1.10 | 0.52±0.38 | 5.71±2.36 | 0.32±0.13 |
| | 60 | 2.81±1.262 | 2.21±1.14 | 0.53±0.38 | 0.64±0.35 | 0.31±0.13 |
| Hawkes-1 | 10 | 0.25±0.21 | 0.26±0.21 | 0.27±0.25 | 0.11±0.12 | 0.07±0.06 |
| | 15 | 0.33±0.24 | 0.34±0.23 | 0.27±0.25 | 0.11±0.11 | 0.05±0.06 |
| | 20 | 0.36±0.30 | 0.37±0.30 | 0.27±0.25 | 0.14±0.13 | 0.06±0.06 |
| | 30 | 0.42±0.35 | 0.43±0.35 | 0.27±0.25 | 0.19±0.11 | 0.06±0.06 |
| Hawkes-2 | 10 | 0.70±0.78 | 0.77±0.94 | 0.44±0.43 | 0.15±0.15 | 0.10±0.08 |
| | 15 | 0.83±0.92 | 0.88±1.13 | 0.44±0.44 | 0.16±0.17 | 0.10±0.09 |
| | 20 | 0.89±1.00 | 0.97±1.24 | 0.43±0.43 | 0.14±0.14 | 0.10±0.09 |
| | 30 | 0.96±1.11 | 1.07±1.23 | 0.43±0.44 | 0.17±0.17 | 0.10±0.10 |
| Hawkes-3 | 10 | 0.74±0.80 | 0.78±0.84 | 0.23±0.21 | 0.16±0.15 | 0.10±0.08 |
| | 15 | 0.87±0.92 | 1.00±1.04 | 0.23±0.21 | 0.15±0.16 | 0.09±0.09 |
| | 20 | 1.06±1.05 | 1.17±1.25 | 0.23±0.21 | 0.14±0.16 | 0.09±0.09 |
| | 30 | 1.10±1.19 | 1.21±1.51 | 0.23±0.21 | 0.16±0.16 | 0.09±0.09 |

304

| Method | K = 10 | K = 15 | K = 20 |
|---|---|---|---|
| IP-Stable | 3 | 6 | 7 |
| CI | 1 | 2 | 3 |
| $CI_M$ | 4 | 5 | 6 |

AVERAGE TREATMENT EFFECT FOR PAIRED DATA

BACKGROUND

The present invention relates generally to the field of data pairing technology, and more specifically causal inference data collection technology.

Data collection is the process of gathering and measuring information on targeted variables in an established system, which then enables one to answer relevant questions and evaluate outcomes. Data collection is a research component in all study fields, including physical and social sciences, humanities, and business. While methods vary by discipline, the emphasis on ensuring accurate and honest collection remains the same. Generally, the goal for all data collection is to capture quality evidence that allows to lead to the formulation of convincing and credible answers to the questions that have posed.

SUMMARY

According to an aspect of the present invention, there is provided a computer-implemented method. The computer implemented method comprises: identifying a plurality of data variables within a multivariate event dataset; formalizing a causal inference between at least two identified data variables within the multivariate event dataset; generating a structural framework of an average effect value for the multivariate event dataset based on the formalization of the causal inference of the identified data variables; and calculating an inverse propensity score for the generated structural framework of the average effect based on a type of identified variable, a predetermined time associated with the identified variable, and a causal connection strength between the identified variables.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize certain deficiencies with current data collection technology. Specifically, embodiments of the present invention recognize that data collection typically provides limited coverage for collecting data for an event dataset and struggles to identify repeated occurrences as an outcome within the event data. Generally, current data collection technology assumes discrete time in the generation of the framework associated with a data model. Embodiments of the present invention provide solutions that improve the efficiency of data collection and reduce the inaccuracies of data prediction of current data collection technology by formalizing a causal inference between a pair of data variables within a multivariate event dataset and dynamically generating a framework of an average effect for the multivariate event dataset based on the formalization of the causal inference.

Specifically, embodiments of the present invention improve the current data collection technology by learning and quantifying the causal effect between any pair of events, assuming only time-stamped, asynchronous, irregularly spaced event occurrence data on the timeline spanning multiple event types as input. Embodiments of the present invention achieve this by formalizing an Average Treatment Effect (ATE) framework for dynamic correlated event data sets, using the framework for the ATE to multivariate point processes, generating a propensity score and inverse propensity score re-weighting procedure for a better ATE estimation that adjusts for the impact of other event covariates (i.e., other historical occurrences or events that could impact a later event).

Figure 1:
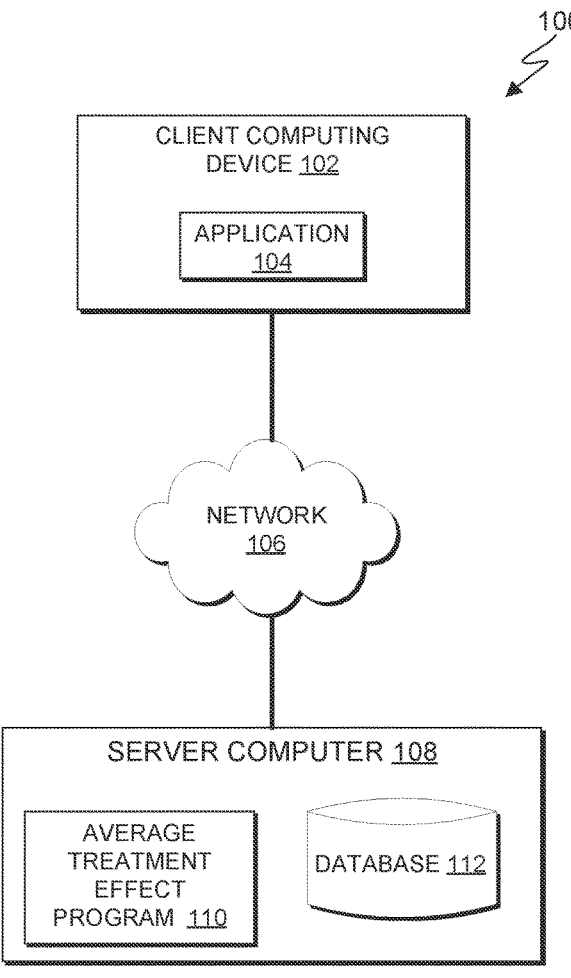
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access average treatment effect program 110 (e.g., using TCP/IP) to dataset information. In this embodiment, dataset information can be synthetic or real. For example, synthetic datasets can include PGEM, Hawkes, and/or hybrid. In some examples, a real dataset can include a dataset for diabetes. Application 104 can further communicate with average treatment effect program 110 to formalize a causal inference between a pair of event variables in a multivariate point process, provide a framework for the average treatment effect (ATE) to multivariate point processes based on the formalization, propose a propensity score an inverse propensity (IP) score for re-weighting procedure for better ATE estimation to adjust for the impact of other event covariates, and derive and obtain the equivalence of propensity scores and balance for ATE in multivariate point processes, as discussed in greater detail in FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts average treatment effect program 110 and database 112. In this embodiment, average treatment effect program 110 resides on server computer 108. In other embodiments, average treatment effect program 110 can have an instance of the program (not shown) stored locally on client computer device 102. In other embodiments, average treatment effect program 110 can be a standalone program or system that can formalize a causal inference between a pair of event variables in a multivariate point process and provide a framework for the average treatment effect (ATE) to multivariate point processes based on the formalization. In yet other embodiments, average treatment effect program 110 can be stored on any number or computing devices.

Average treatment effect program 110 infers a causal connection strength between a pair of events between event types using event datasets. In this embodiment, an event dataset may refer to occurrences of a various events and event types over time. In this embodiment an event can refer to an occurrence of a particular type of data. For example, with respect to customer transactions, an event could mean a purchase or a sale. Each occurrence can be received as part of multivariate/marked asynchronous event stream wherein each event or occurrence has a timestamp and a complex object that serves as a "mark". A "mark", as used herein, refers to a type of event related detail (e.g., relational, also known as "dyadic", event includes information such as: Actor 1<Action>Actor 2), can be hierarchically organized, and can include location information.

Event data sets can include web logs, customer transactions, network notifications, political events, financial events, insurance claims, health information (e.g., log information), and other medical events. Specifically, in an event dataset related to health information, the event data set can log the following event types in a chronological timeline: first hospital admission, first home health visit, second hospital admission, first prescription refill, second home health visit, third home health visit, and so on. Average treatment effect program 110 can infer causal connection strength between a pair of events (e.g., first hospital admission and first home health visit).

In this embodiment an event data set is defined as D= $\{l_i, t_i\}$, i=1, ..., N; $l_i \in L$, |L|=M, wherein there are M types of event types/labels and wherein N represents events in the dataset. Embodiments of the present invention assumes event datasets are temporally ordered between $t_0=0 \le t_1$ and $t_{N+1}=T \ge t_N$ In this embodiment, average treatment effect program 110 can measure inter-event times. For example, in a timeline ranging from $t_0$ to $t_{20}$, there can be three different event types (e.g., A, B, C, each representing a different event) and occur at different times. Specifically, Event A could happen at time 2, followed by Event B at time 3 and event C occurring at time C. A second instance of Event B could occur at time 6 while a second instance of Event A could occur at time 12, while a third instance of Event B could occur at time 13 and the second instance of Event C could occur at time 20. In this example, average treatment effect program 110 can express the following for events between event labels Z and X, wherein (Z≠X) are $\{\hat{t}_{zx}\}$:$\{\hat{t}_{ac}\}$={2,8}; $\{\hat{t}_{bc}\}$={1,7}. Average treatment effect program 110 can also express the following between event label Z (including the period at the end, as $\{\hat{t}_{zz}\}$. Using the example above, average treatment effect program 110 can identify $\{\hat{t}_{bb}\}$={3,7,7}.

Average treatment effect program 110 can generate causal inference (e.g., causal effect) in an event dataset without times series (e.g., to answer how would event A's occurrence in history impact event B in the future?). Put another way, average treatment effect program 110 learns and quantifies the causal effect between any pair of events, assuming only time-stamped, asynchronous, irregularly spaced event occurrence data on the timeline spanning multiple event types as input. In this embodiment average treatment effect program 110 achieves this by formalizing an average treatment effect framework for dynamic correlated event data sets and a computational method to quantify the causal effect using balanced propensity scores for the dynamic correlated event data sets.

In this embodiment, average treatment effect program 110 formalizes a causal inference between a pair of event variables in a multivariate point process by providing a framework for the average treatment effect (ATE) to multivariate point processes based on the formalization. For example, average treatment effect program 110 can provide the following causal inference framework for a pair of event labels (z, y):

The treatment variable $Z_t$ at time t is expressed as a function of Z's historical occurrences (i.e., Equation 1, $$Z_t = f_z(H_t^z)).$$

Recent history formulation: whether or not z has occurred at least once within a window w into the past from time t [t−w,t)].

The outcome variable $Y_t$ is expressed a function of y's future occurrences at t, i.e., Equation 2, $$Y_t = f_y(F_t^y).$$

In this embodiment, average treatment effect program 110 can consider uncertainty which is the occurrence rate of $\lambda_y(t)$ of the effect label y at time t given the treatment.

Covariates $X_t$ can be expressed as a function of historical occurrences of event labels other than z as expressed by Equation 3:

$$X_t = f_{-z}(H_t^{-z}).$$

Average treatment effect program 110 can consider recent history formulation, that is, whether other event labels have occurred at least once within [t–w, t)].

In this embodiment, average treatment program 110 provides the following definition for Average Treatment Effect (ATE), using Equation 4:

$$ATE = E_t\left[\lambda_y^1(t) - \lambda_y^0(t)\right]$$

under strong ignorability and overlap assumptions.

Average treatment effect program 110 can then propose a propensity score an inverse propensity (IP) score for re-weighting procedure for better ATE estimation to adjust for the impact of other event covariates using the following formula, Equation 5:

$$e_t^* = e(X_t^w) = P\left(Z_t^w = 1/X_t^w\right)$$

Figure 2:
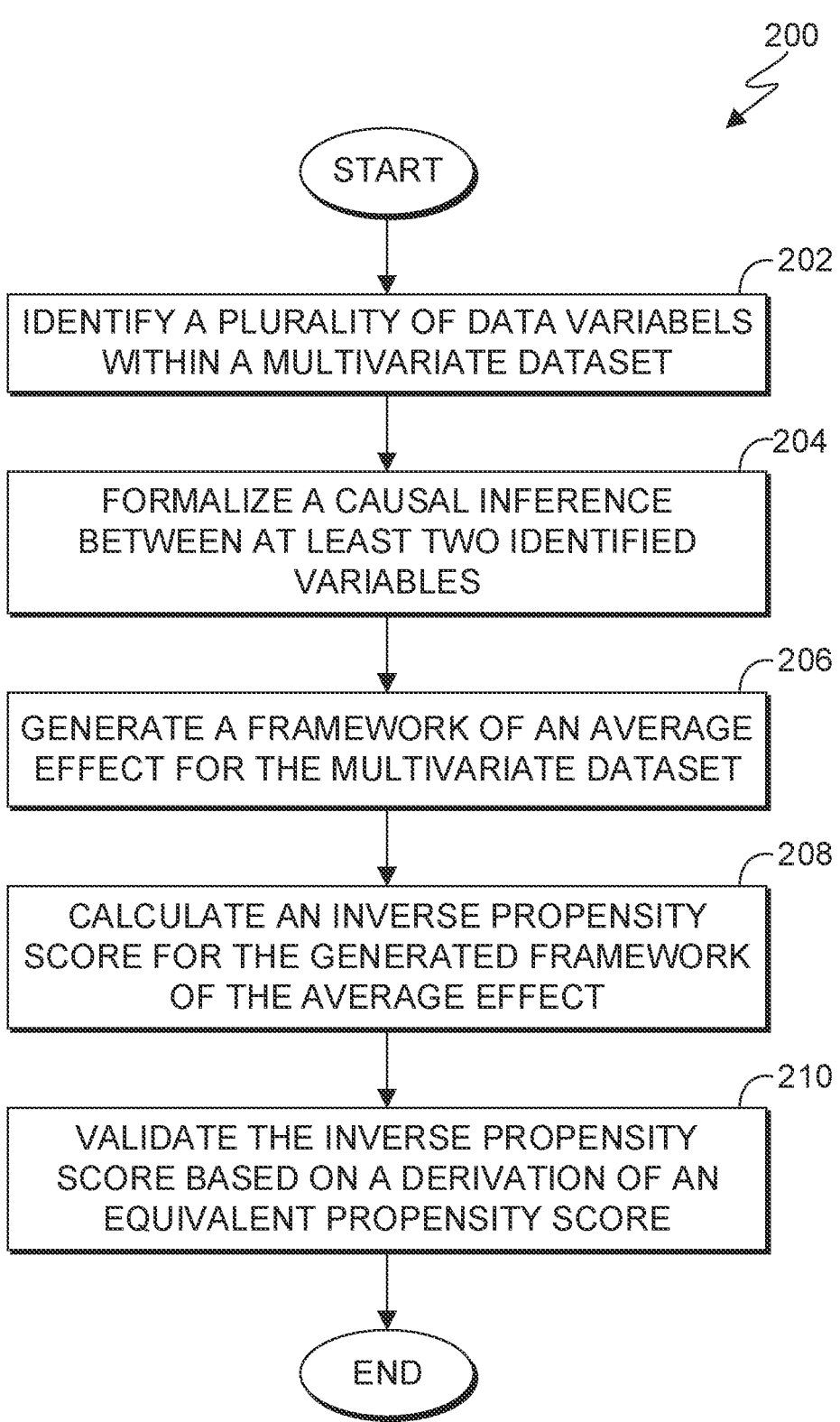
FIG. 2 is a flowchart illustrating operational steps for inferring a connection strength between a pair of events, in accordance with at least one embodiment of the present invention.

In this embodiment average treatment effect program 110 can use the following formula for the adjustment of covariates, Equation 6

$$P\left(Z_t^w = 1/X_t^w\right) = \frac{D(Z_t^w = 1; X_t^w)}{D(X_t^w)}$$

as discussed in greater detail in FIG. 2.

Average treatment effect program 110 can then derive and obtain the equivalence of propensity scores and balance for ATE in multivariate point processes and use the following formula, Equation 7:

$$E_t\left[\lambda_y^1(t) \mid X_t^w, Z_t^w = 1\right] - E\left[\lambda_y^0(t) \mid X_t^w, Z_t^w = 0\right] = E_t\left[\lambda_y^1(t) - \lambda_y^0(t) \mid e_t^*\right]$$

as discussed in greater detail in FIG. 2.

In this embodiment, average treatment effect program 110 can estimate ATE in practice. Given the parameters W (e.g., given or use prior knowledge), $$e_t^*: D(X_t^w)$$

is the duration of $$x_t^w$$

is true in the data, Equation 8.

$$D(Z_t^w = 1; x_t^w) = \sum_{i=1}^{N+1} \int_{t_{i-1}}^{t_i} I_{x_t^w}(Z_t^w = 1, t)dt$$

In this embodiment, average treatment effect program 110 can use a proximal event model, Equation 9 $\lambda_{y|Z_t}$.

Thus, in this embodiment, the ATE can be estimated using the following formulas, Equations 10 and 11.

$$ATE = \frac{1}{T}\int_{t=0}^{T} \alpha_t \cdot \lambda_y^1(t) - \frac{1}{T}\int_{t=0}^{T} \alpha_t \cdot \lambda_y^0(t)$$

$$\alpha_t = \frac{Z_t^w}{e_t^*} + \frac{1 - Z_t^w}{1 - e_t^*}$$

Thus, average treatment effect program 110 can formalize a causal inference between a pair of event variables in a multivariate point process by generating a framework of the average treatment effect (ATE) to multivariate point processes and generating a propensity score and inverse propensity score re-weighting procedure for better ATE estimation that adjusts for the impact of other event covariates. Finally, average treatment effect program 110 can derive and obtain the equivalence of propensity scores and balancing for ATE in multivariate point processes.

Database 112 stores received information and can be representative of one or more databases that give permissioned access to average treatment effect program 110 or publicly available databases. For example, database 112 can store received datasets and/or databases. As mentioned before, dataset information can be synthetic or real. For example, synthetic datasets can include PGEM, Hawkes, and/or hybrid. In some examples, a real dataset can include a dataset for diabetes. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 is a flowchart 200 illustrating operational steps for inferring a connection strength between a pair of events, in accordance with at least one embodiment of the present invention.

In step 202, average treatment effect program 110 identifies a plurality of data variables within a multivariate event dataset. A data variable as used herein refers to a data point that may be modified in response to changes to the multivariate event dataset occurring at a predetermined period of time. A data point can be an event or an occurrence of an event within a multivariate event dataset. For example, a data point can be a plurality of scheduled events within an estimated data model associated with medical visits for the user. In yet another example, duration of use of an automobile, location of a building associated with an appointment, types of data within a dataset can also be used as datapoints. In general, a data variable, also referred to as a data point or an event depending on context can be any other variable that changes over time.

In this embodiment, average treatment effect program 110 identifies the plurality of data variables within the multivariate event dataset by analyzing the multivariate event dataset for a data variable based on a plurality of indicative markers, retrieving at least two analyzed data variables based on the plurality of indicative markers, and identifying the retrieved data variables. For example, average treatment effect program 110 can receive a stream of information, pursuant to user permissions, regarding the user's health information (e.g., a health dataset). In this example, average treatment effect program 110 can identify thirteen events or occurrences and classify each event into different types and identify the occurrence of each event type. In this example, average treatment effect program 110 can identify three different event types (e.g., a prescription refill, hospital admission and a home health visit). In this example, average treatment effect program 110 can identify that a prescription refill occurred three times, hospital admissions occurred five times, and home health visits occurred five times as well.

Average treatment effect program 110 can also identify these events in chronological order noting the first time an event happened in the sequence of events for a given dataset. For example, average treatment effect program 110 can identify that a hospital admission was the first event in a dataset followed by a home health visit and so on.

In this embodiment, average treatment effect program 110 can use indicative markers to distinguish one event and accompanying event type from another respective event and event type within a dataset. Examples of indicative markers can include the type of data within one dataset, size of dataset, age of dataset, origin of dataset, and accessibility of dataset may be indicative markers. Average treatment effect program 110 can also use indicative markers to distinguish from different datasets altogether.

In another embodiment, average treatment effect program 110 identifies a treatment variable within the multivariate event dataset. As used herein, a treatment variable is defined as a function of historical occurrences associated with an identified data point. For example, the treatment variable is the frequency that a building location (i.e., data variable) occurs within the multivariate event dataset. In this embodiment, average treatment effect program 110 expresses the treatment variable as the following equation:

$$Z_t = f_z(H_t^z) \qquad 1)$$

In equation 1, average treatment effect program 110 defines $Z_t$ as the treatment variable at a predetermined time t, which is equal to a function associated with the treatment variable and a history formulation based on historical occurrences associated with the treatment variable. In another embodiment, average treatment effect program 110 identifies an outcome variable within the multivariate event dataset. In this embodiment, average treatment effect program 110 defines the outcome variable as a prediction of future occurrences of the identified variable within the multivariate event dataset. In this embodiment, average treatment effect program 110 expresses the outcome variable as the following equation:

$$Y_t = f_y(F_t^y) \qquad 2)$$

In equation 2, average treatment effect program 110 defines $Y_t$ as the outcome variable at the predetermined period of time t, which is equal to a function associated with the outcome variable and an occurrence rate of the outcome variable at the predetermined time. In another embodiment, average treatment effect program 110 modifies the occurrence rate of the outcome variable using the treatment variable. In another embodiment, average treatment effect program 110 identifies a covariate variable within the multivariate event dataset. In this embodiment, average treatment effect program 110 defines the covariate variable as a function of historical occurrences of event labels other than the treatment variable. In this embodiment, average treatment effect program 110 expresses the covariate variable as the following equation:

$$X_t = f_{-z}(H_t^{-z}) \qquad 3)$$

In equation 3, average treatment effect program 110 defines $X_t$ as the covariate variable at the predetermined time t, which is equal to a function associated with any data type except the treatment variable and a historical formulation based on historical occurrences associated with any data type the is not the treatment variable.

In step 204, average treatment effect program 110 formalizes a causal inference between at least two identified data variables within the multivariate event dataset. In this embodiment, average treatment effect program 110 formalizes the causal inference between the identified variables by determining a causal connection strength for the identified data variables within the multivariate event dataset. For example, average treatment effect program 110 formalizes a causal inference between two event datapoints within an event database (e.g., a binary treatment variable at a time t that has occurred at least once within a window and the outcome variable is the occurrence rate of an effect label and formalizes an inference between the two variables).

In another embodiment, average treatment effect program 110 formalizes the causal inference between the at least two identified data variables by generating a data structure that plots each identified data variable within an estimated data model. Average treatment effect program 110 generates a data structure that plots each identified data variable by estimating a plurality of treatment effects (e.g., redirecting flow of electricity around a damaged capacitor) between a treatment variable (e.g., reduction of electrical charge) associated with historical occurrences and an outcome variable (e.g., calculated change in electrical charge) associated with a different occurrence.

In this embodiment, average treatment effect program 110 formalizes the causal inference between the identified data variables using an estimated data model for predicting outcomes associated with collected data based on the formalized causal inference.

In step 206, average treatment effect program 110 generates a framework of an average effect for the multivariate event dataset based on the formalization of the causal inference. In this embodiment, average treatment effect program 110 generates the framework (i.e., data model) for an average effect value for the multivariate event dataset by calculating a difference between the identified variables at a plurality of predetermined times. As used herein, the average effect value is defined as a numerical value associated with a calculated average change in the estimated data model in response to formalization of the causal inference between the identified data variables. In this embodiment, average treatment effect program 110 expresses the average treatment effect values as the following equation:

$$ATE = E_t[\lambda_y^1(t) - \lambda_y^0(t)] \qquad 4)$$

In this embodiment, average treatment effect program 110 formalizes the causal inference between the identified data variables using an estimated data model for predicting outcomes associated with collected data based on the formalized causal inference. In equation 4, average treatment effect program 110 defines ATE as the average treatment effect value associated with the identified treatment variable. In this equation, average treatment effect program 110 defines Et as the effect value given a predetermined time. In this equation, average treatment effect program 110 defines $$\lambda_y^0$$

as an occurrence rate of an identified data variable, which in this case is the outcome variable, taken at two predetermined periods of time. In this embodiment, average treatment effect program 110 generates the framework, which is defined as a structural organization of data in the form of a data model, that ignores outlier causal connections between identified variables and overlaps data predictions used the calculated average effect value.

In another embodiment, average treatment effect program 110 adjusts the average effect value based on an adjustment associated with the identified covariate variable. In another embodiment, average treatment effect program 110 formalizes a causal inference between at least two identified data variables within a multivariate event dataset where datasets are multivariate temporal event datasets; generates a structural data framework of an average effect value for the multivariate event dataset based on the formalization of the causal inference of the identified data variables; and calculates an inverse propensity score for the generated data framework of the average effect based on a plurality of factors. In this embodiment, average treatment effect program 110 has a clear definition of estimate in the causal inference in ATE. Specifically, average treatment effect program 110 uses a first computable propensity score to adjust covariates and proposes an approach using propensity scores to adjust covariates to obtain ATE by using weights to account for data imbalance.

In step 208, average treatment effect program 110 calculates an inverse propensity score for the generated framework of the average effect based on a plurality of factors. In this embodiment, average treatment effect program 110 calculates the inverse propensity score for the generated framework of the average effect by modifying the identified variable. In this embodiment, modification to the identified variable can include changing the type of identified variable, changing the predetermined time associated with the identified variable, and changing the causal connection strength between the identified variables.

As used herein, the inverse propensity score refers to a standardized calculation that optimizes the generated framework associated with the average effect by strengthening the causal inference between the identified variables based on a plurality of predicted outcomes. In this embodiment, average treatment effect program 110 express the calculated inverse propensity score as the following equation:

$$e_t^* = e(X_t^w) = P\big(Z_t^w = 1/X_t^w\big)$$
5)

In equation 5, average treatment effect program 110 defines e*$_t$ as the inverse propensity score, which is equal to the effect value for the covariate variable at the predetermined period of time within a predetermined window, w.

In this embodiment, average treatment effect program 110 can adjust covariates, that is, adjust other variables that may impact events using the inverse propensity. In this embodiment, average treatment effect program 110 calculates the modification of the using the following expression:

$$P\big(Z_t^w = 1/X_t^w\big) = \frac{D(Z_t^w = 1; X_t^w)}{D(X_t^w)}$$
6)

In equation, average treatment effect program 110 defines D as a difference value associated with the identified variable between a first predetermined period of time and a first window and a second predetermined period of time and a second window.

In step 210, average treatment effect program 110 validates the inverse propensity score based on a derivation of an equivalent propensity score. In this embodiment, average treatment effect program 110 validates the calculated inverse propensity score by calculating an equivalent propensity score and ensuring that the inverse propensity score and equivalent propensity score are equal. Conversely, a propensity score refers to a standardized calculated that optimizes the generated framework. In this embodiment, average treatment effect program 110 validates the inverse propensity score associated with the average effect value of the generated framework using the following expression:

$$E_t\big[\lambda_y^1(t) \mid X_t^w, Z_t^w = 1\big] - E\big[\lambda_y^0(t) \mid X_t^w, Z_t^w = 0\big] = E_t\big[\lambda_y^1(t) - \lambda_y^0(t) \mid e_t^*\big]$$

In equation 7, average treatment effect program 110 sets the two sides of the equation equal to each other to ensure that the calculation of the inverse propensity value is correct. In this embodiment, average treatment effect program 110 validates the inverse propensity score to increase the efficiency in the prediction of outcomes associated with generated framework. For example, average treatment effect program 110 validates the inverse propensity score on a diabetes dataset, where an expert provided 11 pairs such that a cause label is more likely to make the effect label occur, split the 11 pairs into training data sets and testing data sets, identifies an optimal time window based on the training data set, and subsequently deployed for the testing data set for validation.

In another embodiment, average treatment effect program 110 automatically terminates an operation of the generated framework in response to the validated inverse propensity score meeting or exceeding a predetermined threshold. In response to validating the inverse propensity score, average treatment effect program 110 automatically terminates an operation of the computing device 102 based on the generated framework.

Figure 3A:
FIGS. 3A and 3B depict results of connection strength, in accordance with at least one embodiment of the present invention.
Figure 3B:

FIGS. 3A and 3B depict results of connection strength, in accordance with at least one embodiment of the present invention. In general, FIG. 3 depicts an experimental setup between synthetic and real datasets. In this example, baselines were set with the following conditional intensity score formulas, (CIS formula 1 and CIS formula 2) below:

$$CI(z, y) = \lambda_{y|z}^w - \lambda_{y|\bar{z}}^w$$
CIS Formula 1

$$CI_M(z, y) = \text{mean} \big(\lambda_{y|z,x}^w - \lambda_{y|\bar{z},x}^w\big).$$
CIS Formula 2

FIG. 3A represents the results for synthetic datasets. In this embodiment, the synthetic datasets include PGEM and Hawkes. In other embodiments, average treatment effect program 110 can use any number of synthetic datasets.

Specifically, FIG. 3A depicts table 302. Table 302 depicts synthetic dataset results that include PGEM 1, 2, and Hawkes 1, 2, and 3 respectively that each depict varying window sizes (10, 20, 30, 40, 60 for PGEM and 10, 15, 20, 30 for Hawkes).

FIG. 3B represents results of real data sets. In this embodiment, the real dataset used pertains to a medical condition. Specifically, FIG. 3B represents results for diabetes depicting different methods and results thereof.

FURTHER COMMENTS AND/OR EMBODIMENTS

Causal inference and discovery from observational data has been extensively studied across multiple fields. However, most prior work has focused on independent and identically distributed (i.i.d.) data. Some embodiments of the present invention propose a formalization for causal inference between pairs of event variables in multivariate recurrent event streams by extending Rubin's framework for the average treatment effect ("ATE") and propensity scores to multivariate point processes. Analogous to a joint probability distribution representing i.i.d. data, a multivariate point process represents data involving asynchronous and irregularly spaced occurrences of various types of events over a common timeline. Some embodiments of the present invention theoretically justify our point process causal framework and show how to obtain unbiased estimates of the proposed measure. Some embodiments of the present invention conduct an experimental investigation using synthetic and real-world event datasets, where the proposed causal inference framework is shown to exhibit superior performance against a set of baseline pairwise causal association scores.

Introduction

It is widely known that the gold standard for effective causal inference is through the use of interventional data such as randomized controlled trials, which are deployed to measure the impact of some treatment on an outcome of interest. However, intervening in the system can often be impractical or even impossible, in which case one must conduct causal analysis using observational data alone.

Observational data in the form of multivariate event streams are readily available in several domains, including health, finance, retail, sales, and maintenance. Analogous to how an observation in an i.i.d dataset can be viewed as a sample from a joint distribution over a set of random variables, a multivariate event stream can be viewed as a sample from a multivariate point process over a set of event label; the process captures the inter-dependent dynamics of event arrivals, where the rate at which an event label occurs depends on the prior historical occurrences of a subset of the event labels. Modeling, fitting, and predicting future occurrences given a multivariate, temporal stream of events is an important area of research in statistics; it has been pursued in data mining for both extracting patterns and making predictions, and more recently has also been widely studied in machine learning. Most recent work in this area leverages advances in sequential deep learning for event datasets. Other models of temporal point processes include Poisson nets, non-homogeneous Poisson processes, Poisson cascades, piece-wise constant conditional intensity models, and proximal graphical event models.

There is a vast body of related work in survival analysis that studies pairs of events with continuous covariates, involving short event streams with both continuous and discrete variables and usually only one occurrence of the outcome. While a general theory for point process counterfactual inference has been developed, practical algorithms and models focus on the continuous covariates and hazard models. In addition, there is also related work around event intervention with counterfactual Gaussian process with action. When covariates are discrete events only, existing models and estimation methods cannot be trivially applied to the problem. Moreover, dynamic treatment related work assumes time as discrete units and have crucially motivated later work for continuous-time data, which aims to reduce bias or high variance in discretizing time.

Some embodiments of the present invention focus on the setting where data is of the form of long event streams with multiple occurrences of various types of events, including both the treatment event and outcome event, anchoring the version of the pairwise causal inference problem to multivariate point processes. For example, one is often interested in knowing whether taking a particular medicine would improve the chance of recovery of a patient, or whether an earthquake in Japan would result in a significant market change in the near future.

Causal inference entails drawing a conclusion about a causal relationship between potential causes and effects; some embodiments of the present invention focus on causal inference between pairs of event labels observed in event stream data, different from Granger causal graph learning. In particular, some embodiments of the present invention pose the following causal inference problem for multivariate point processes: how can one meaningfully measure the causal relationship between a cause event label z to effect event label y? Such a causal measure would shed light on whether the cause label z amplifies, inhibits, or has no effect on the effect label y, while taking into account the potential effects of all other event labels x. This problem deviates from the typical causal inference setting in several ways. First, most causal inference methods assume that we are given a set of i.i.d. observations. In one setting, events may be correlated across time and therefore it is necessary to make certain independence assumptions in order to identify the effect of interest. Second, in most causal inference settings some embodiments of the present invention are interested in the expected value of a single observable outcome such as mortality. In one setting, however, some embodiments of the present invention have repeated occurrence of such an outcome over time and are interested in an event frequency (or, more precisely, an instantaneous intensity). Thus existing methods that estimate causal effects in terms of expectations are not applicable.

Note that the analogous causal inference problem is more straightforward to address for random variables over i.i.d. data, primarily because it is not difficult (in theory) to compute probabilities for pairs of random variables by marginalizing over the set of other random variables. However, since event z's historical occurrences could have a complex dynamic effect on another event y's occurrence at any time in a multivariate point process, there are a number of questions to address before one can study the causal effect of z on y.

Background

A multivariate event stream (or event dataset) is a sequence of events, $$D = \{D_i\}_{i=1}^{N},$$

where each event $D_i$ includes an event label (or synonymously type or variable) and a timestamp, i.e. $D_i=(x_i, t_i)$. $x_i$ belongs to the label set L, whose cardinality is M, i.e. |L|=M, and $t_i$ is the time of occurrence, $t_i \in \mathbb{R}^+$. Some embodiments of the present invention assume a strictly temporally ordered dataset, $t_i < t_j$ for i<j, initial time $t_0=0$ and end time $t_{N+1}=T$. Let z, y refer to an arbitrary pair of event labels belonging to L.

Multivariate event streams can be regarded as samples from a multivariate point process, which associates each label with a counting process. It uses conditional intensity functions $\lambda_y(t H_t) > 0$ that represent the rate at which events of type y occur at time t given the historical stream of event labels up to t, i.e. $H_t = \{(x_i, t_i): t_i < t\}$. In a multivariate point process, the probability of observing y as the next event at time t is:

$$p\left(l_t = \frac{y}{H_{t_n}}\right) = \lambda_y(t H_t)\exp\left(-\int_{t_n}^t \sum_{k \in L} \lambda_x\left(\frac{T}{H_T}\right)dT\right) \quad 12)$$

With respect to equation 8, $t_n$ is the most recent event occurrence time before t. It can be shown that $$\lambda_y\left(\frac{T}{H_T}\right)dT = E\left[\frac{N_y([t, t+dt])}{H_t}\right],$$

where $N_y(A)$ denotes the number of y occurrences in a time interval A.

Prior work has proposed the notion of process independence among event labels to characterize relationships among the labels' counting processes. The basic idea is that the intensity of one type of event does not depend on certain past events once we know about specific other past events. This is an asymmetric concept, similar to Granger causality. Informally, for sets of labels x, y and z s.t. $y \cap z = \emptyset$, x is process independent of y given z when all labels in x have conditional intensities that do not functionally depend at any time on the history of labels in y given the history of labels in z. Process independence is captured in graphical event models, where the conditional intensity for an arbitrary label y at any time t depends only on historical occurrences of its event label parents in the underlying graph.

A minimal graphical representation can be used to define direct causes in multivariate point processes, analogous to direct causes in causal networks: Event label z is a direct cause of label y if z belongs to the minimal set of nodes u s.t. y is process independent of all other labels given u.

Causal Ingerence in Multivariate Point Processes

Some embodiments of the present invention introduce an extension of the Neyman-Rubin potential outcomes causal inference framework involving average treatment effects (ATE) to study how an event label z affects event label y in a multivariate point process. In this class of models, treatment is denoted as $z \in \{0, 1\}$ where 0 is thought of as the control and 1 the treatment. The potential outcome $y^z$ for each z is the outcome if treatment z is applied. The main difficulty of causal inference comes from the fact that only the outcomes from the administered treatments are observed and never any of the other outcomes. Hence it may also be viewed as a missing data problem.

Some embodiments of the present invention estimate the treatment effects between a treatment variable associated with historical occurrences of z and an outcome variable (or response) associated with y's occurrence, under some assumptions. The covariate variables x involves historical occurrences of labels other than z, i.e. x=L\z. Some embodiments of the present invention assume all variables are observed, hence causal sufficiency is satisfied. Some embodiments of the present invention first define treatment, outcome, and covariate variables in the context of multivariate point processes as well as the underlying assumptions, and then derive the propensity score.

Defining Treatment, Outcome, and Covariates

There are many possible ways to define the treatment, outcome, and covariates in a multivariate point process. Some embodiments of the present invention begin with the following general formulation. Some embodiments of the present invention use $Z_t$ to represent the treatment variable at time t, distinguishing it from the event label z. Let $$H_t^z$$

be the history of event z occurrences before t, and $$K_t^y$$

be the future of event y occurrences at t.

General Formulation for Causal Inference: for a pair of event labels (z, y), the treatment variable $Z_t$ at time t is a function of z's historical occurrences, i.e.

$$Z_t = f_z(H_t^z).$$

The outcome variable is a function of y's future occurrences at t, i.e.

$$Y_t = f_y(K_t^y).$$

The covariates $X_t$ are a function of historical occurrences of event labels other than z, i.e.

$$Z_t = f_{-z}(H_t^{-z}).$$

Some embodiments of the present invention need to summarize historical occurrences $$H_t^z.$$

Due to potential multiple (re)-occurrence of treatment and outcome, the representation of history needs to be carefully modeled based on certain assumptions at each time t. Some embodiments of the present invention take a simplified yet practical view of treatment, capturing the assumption that the most recent history is sufficient for causation. Some embodiments of the present invention do this by assuming that only a recent time window [t−w, t) for some window w could directly have a causal impact on the outcome at time t; such an assumption has been used previously in point process models. This provides an efficient and interpretable definition of the treatment. Similarly, some embodiments of the present invention assume that covariates are also defined by whether they have appeared at least once in some recent time window.

Some embodiments of the present invention measure a statistical quantity associated with the outcome in multivariate point processes, based on future occurrences of y, $$K_t^y,$$

from time t. It is natural to consider the instantaneous expected number of occurrences of the treatment effect y, $E[N_y([t, t+dt])|H_t]$, in place of $$K_t^y.$$

Moreover, the expected count $E[N_y([t, t+dt])|H_t]$ is naturally equal to $\lambda_t(t)dt$ by definition. Note that at each time, the history can be very different with the proximal assumption, hence the rate at each time in $$K_t^y$$

can also be different.

Recent History Formulation for Causal Inference: for a pair of event labels (z, y), the binary treatment variable $$Z_t^w$$

at time t is defined by whether or not z has occurred at least once within a window w into the past from t. The outcome variable is the occurrence rate of the effect label y at time t given the treatment, $$Y_t = \lambda_{\underset{Z_t}{y}}(t).$$

254 The covariates $$X_t^w$$

at time t are a binary vector, depending on whether other event labels have occurred at least once in [t−w, t), w∈ (0, t). In event streams, it is possible for the cause and effect to be the same label in history, for instance, consider a system with negative self-feedback. Hence z and $X_t$ can be identical to or contain y, but z and $X_t$ are disjoint sets of events.

Some embodiments of the present invention summarize the assumptions in this formulation of causal inference: 1) events before t−w have no impact on y's occurrence rate at time t. This enables memory in time yet provides a compact representation of history, 2) only the occurrence of z in the window impacts y's rate at time t, regardless of the number of occurrences, and 3) the specific times of z's occurrences do not further affect y's rate at time t. Such a model can be robust to outliers or noisy historical observations.

Defining Average Treatment Effect

To measure how label y responds to the historical occurrences of z, average treatment effect (ATE) can be extended to our formulation in multivariate point processes. Some embodiments of the present invention define the mean potential outcome $Y_t$ under treatment assignment $$Z_t^w = k$$

as $$\mu_y^k := \frac{1}{T}\int_0^T \lambda_y^k(t)dt,$$

where T is the maximal time horizon.

$$\mu_y^k$$

has an intuitive interpretation: it is the rate of y given $$Z_t^w = k$$

in its history w, averaged over time over the horizon $t_0$=0 to T. The average of rate over time measures the temporal average of instantaneous event occurrence counts under treatment. It is a natural way to aggregate an event's expected occurrence counts in continuous time and captures the event dynamics affected by the proposed treatment.

Average Treatment Effect (ATE) for event 285 pairs is defined as:

$$ATE = E_{H_T}[\mu_y^1 - \mu_y^0] = E_{H_T}\left[\frac{1}{T}\int_t \lambda_y^1 - \lambda_y^0(t)dt\right] \quad (13)$$

With respect to equation 13, $$\lambda_y^1(t)$$

is $$\lambda_{\underset{z_t}{y}}(t)$$

at time t if z does occur at least once in $$H_t(Z_t^w = 1)$$

and $$\lambda_y^0$$

is $$\lambda_{\underline{y}}_{z_t}(t)$$

at t if z does not occur in $$H_t(Z_t^w = 0).$$

The $E_{H_T}[.]$ is the expectation 289 with respect to the random trajectories over [0, T] as induced by the history dependent multivariate point process. Note that since the rate $$\lambda_y^k$$

is the instantaneous expected count of occurrences, ATE can also be viewed as a measure of expected count differences, normalized by the length of the time horizon T. It is important to note that in the definition of ATE, some embodiments of the present invention usually only observe exactly one of two treatment cases for outcome Y at each time t in observational event streams.

Hence, an estimation method is needed to estimate the unobserved counterpart for the intensity rates, or the counterfactual $$\hat{\lambda}_{\underline{y}}_{z_t}(t),$$

as opposed to the factual $$\lambda_{\underline{y}}_{z_t}(t).$$

For a known multivariate point process, one can find the counterfactual $$\hat{\lambda}_{\underline{y}}_{z_t}(t)$$

and hence the ATE by looking up the conditional intensity function with the corresponding parental conditions after making an adjustment to the treatment—specifically, removing all occurrences of z in time period [t−w, t) if the factual is $$\lambda_y^1 = 1$$

or inserting z at time t−w if the factual is $$Z_t^w = 0.$$

The following result provides justification for choosing ATE to measure pairwise causal relation in a multivariate point process.

The above theorem also implies that if z is not a parent of y in a graphical event model representation of the underlying multivariate point process, the ATE for (z, y) is 0. To use ATE as defined in equation 9, there are several assumptions that must hold in order to mimic the randomized trials to truly establish causal relationships. Ignorability condition indicates that whether y being 0 or 1 at each time t does not depend on whether $$Z_t^w = 1$$

or 0 at that time, i.e., $$(\lambda_y^1(t), \lambda_y^0(t)) \perp \lambda_y^1 \mid X_t,$$

$\forall t$ (although the y's intensity rate still depends on $$Z_t^w).$$

In other words, some embodiments of the present invention can ignore how each occurrence of y ended up with z's occurrence in history and can treat their potential outcomes as exchangeable. Moreover, overlap condition states that each time t has a strictly positive chance for $$Z_t^w = 1$$

to happen given its history, i.e., $$0 < P(Z_t^w = 1 \mid X_t) < 1.$$

In the literature, strong ignorability is often used when both overlap and ignorability hold true. If the assumption does not hold, possibly due to covariate differences in treatment groups, some embodiments of the present invention need to adjust for these effects using propensity scores. This is particularly important in observational event data, where different times t with $$Z_t^w = 1 \text{ and } Z_t^w = 0$$

may not be directly comparable, because the covariates $$X_t^w$$

may not be similar to each other.

Defining Propensity Scores

The propensity score, as introduced in, is proposed to resolve covariate differences in non-randomized experiments to mimic a randomized study. The propensity score is a balancing score: conditioned on any balancing score, the distribution of observed covariates will be similar between the treated and control groups. The propensity score provides a way to summarize covariate information about the treatment selection so that direct comparison is more meaningful between treated and non-treated groups.

Some embodiments of the present invention define a set of balancing scores, $$b(H_t^{-z})(b_t^*$$

for short), as a function of the covariates. The goal is to make the treatment conditionally independent of the covariates given the scores:

$$Z_t \perp H_t^{-Z} \mid b(H_t^{-Z}),$$

$\forall t$. Some embodiments of the present invention use the same recent window assumption and summarize the history $$H_t^{-Z}$$

with a set of covariates $$X_t^w.$$

Hence the balancing score would achieve $$Z_t^w \perp X_t^w \mid b(X_t^w),$$

$\forall t$. The most trivial $$b(X_t^w) \text{ is } b(X_t^w) = X_t^w.$$

However, to consider the sampling distribution of potential cause $$Z_t^w,$$

many-to-one functions of $$X_t^w$$

offer better adjustment, and the coarsest of such a function is the propensity score. Propensity scores indicate the "propensity" toward treatment occurrence given other covariates. Some embodiments of the present invention use the above defined treatment $$Z_t^w$$

and covariates $$X_t^w$$

and derive the equivalent form of propensity score for multivariate point processes. The goal is to derive the propensity score $$e(X_t^w), \text{ or } e_t^*$$

for short, such that $$P(Z_t^w = 1 \mid X_t^w, e_t^*) = P(Z_t^w 1 \mid e_t^*).$$

Some embodiments of the present invention know that:

$$P(Z_t^w = 1 \mid X_t^w) = \frac{D(Z_t^w = 1; X_t^w)}{D(X_t^w)} \qquad (14)$$

With respect to equation 10, $$D(Z_t^w = 1; X_t^w)$$

is the duration that $$Z_t^w$$

is observed true in the dataset. Some embodiments of the present invention define $$P(Z_t^w = 1 \mid e_t^*) = \frac{D(Z_t^w = 1; e_t^*)}{D(e_t^*)}.$$

$D(Z_t^w=1 \mid e_t^*)$ can be interpreted as the duration that $$Z_t^w$$

is observed true, i.e., the total duration of which z occurs in [t−w, t], $\forall t$, in the dataset with the same $$e_t^*$$

in the relevant preceding windows.

The propensity score for all covariates in history $$X_t^w$$

at time t is defined $$e_t^* = e(X_t^w) = P(Z_t^w = 1 \mid X_t^w).$$

Note that $$Z_t^w$$

at any time t follows a distribution $$P(Z_t^w = 1 \mid X_t^w),$$

which depends on the values of $$X_t^w.$$

This quantity can be estimated efficiently by counting the duration of $$Z_t^w = 1$$

with different $$X_t^w$$

values, which we will elaborate upon. The major distinction between the proposed propensity score and that for the traditional i.i.d. case is that $$e_t^*$$

is time-variant and incorporates all occurrences and non-occurrences of events in a window-viewed history. Treatment $$Z_t^w$$

and covariates in history $$X_t^w$$

are conditionally independent of each other, given the propensity score $$e_t^*.$$

A function $$b_t^*$$

is a balancing score, that is $$Z_t^w \perp X_t^w \mid b_t^*,$$

∀t, if and only if $$b_t^*$$

is finer than $$e_t^*$$

in the sense that $$e_t^* = f(b_t^*)$$

for some function f. If the treatment $$Z_t^w$$

is strongly ignorable, then it is strongly ignorable given any balancing score $$b_t^*.$$

That is, if $$\left(\lambda_Y^1(t), \lambda_Y^0(t)\right) \perp Z_t^w \mid X_t^w, \forall \, t \text{ and } 0 < P(Z_t^w = 1 \mid X_t^w) < 1$$

then $$\left(\lambda_Y^1(t), \lambda_Y^0(t)\right) \perp Z_t^w \mid b_t^*, \forall \, t \text{ and } 0 < P(Z_t^w = 1 \mid b_t^*) < 1.$$

Some embodiments of the present invention relate the balancing and propensity score to the estimated of causal event pairs. ATE definition in equation 10 considers the conditional intensity functions. However, the outcome variable $$\lambda_Y^1(t)$$

to treatment $$Z_t^w$$

is observed only at time t if the event's history contains z, that is if $$Z_t^w = 1.$$

23

Hence, if a randomly selected time $t_1$ with $$Z_{t1}^w = 1$$

is compared to a randomly selected time $t_2$ with $$Z_{t2}^w = 0,$$

the average difference of the outcome over time is $$[\mu_y^1 \mid Z_t^w = 1 - [\mu_y^0 \mid Z_t^w = 0],$$

where $$[\mu_y^k | Z_t^w] := \frac{1}{T} \int_t \lambda_y^k(t) | Z_t^w dt.$$

However, the observed data are not from the marginal distribution of y given covariates with $$\lambda_{y|Z_t}^k$$

(t) but rather from the conditional history of y with $$\lambda_{y|Z_t}^k(t) \text{ given } Z_t^w = k,$$

where $k \in \{0, 1\}$ is a specific instantiation of $$Z_t^w$$

in a windowed history. Hence, under the strongly ignorable assignment, time with the same value $$b_t^*$$

but different treatment $$Z_t^w$$

can act as controls for each other, as their expected outcome difference equals the proposed ATE.

It immediately follows that the two-sampling process gives an unbiased estimate of ATE, for pair matching and subclassification techniques to adjust for the propensity score. However, in practice, pair matching is difficult to perform given the continuous nature of time t which results in infinite sampling sizes. Subclassification is also difficult when the number of covariate event labels is large, leading to a high number of classes, increasing the sample requirement on T. Hence, we next propose a typical inverse propensity score weighting procedure to compute ATE for multivariate point processes.

Estimating ATE Scores

There are several parameters that need to be provided or estimated in order to adjust for the propensity score and obtain ATE, including the window size for the treatment definition, conditional intensity rate of the treatment, and the outcome conditional intensity rates. The window size w of the treatment $$Z_t^w$$

definition is treated as an input to the ATE estimation procedure. Moreover, it is used as the window size for all quantities associated with a window, namely $$X_t^w, Z_t^w, \lambda_{y|Z_t}(t), \text{ and } P(Z_t^w|X_t^w).$$

If one wants to estimate a window, practitioners should exercise prior knowledge to set w since the treatment effect with different windows will produce different results. In addition, one may also search for a w that gives the highest absolute ATE difference.

Let $$D(Z_t^w = 1, x_t^w)$$

is the duration that $$Z_t^w$$

is observed true in the dataset and that the condition $$x_t^w$$

is true in the relevant preceding window w.

$$15) D(Z_t^w = 1, x_t^w) = \sum_{i=1}^{N+1} \int_{t_{i-1}}^{\tau_i} I_{x_t^w}(Z_t^w = 1, t)dt$$

With respect to equation 11, $$I_{x_t^w}(Z_t^w = 1, t)$$

is an indicator for whether each instantiation of $$X_t^w, x_t^w,$$

is true and $$Z_t^w = 1$$

at time t as a function of the relevant windows w. Similarly, $$D(x_t^w)$$

is duration that the condition $$x_t^w$$

is true in w. Hence, $$P\left(Z_t^w = 1 | x_t^w\right) = \frac{D(Z_t^w = 1, x_t^w)}{D(x_t^w)}$$

and $$P(Z_t^w = 1 | X_t^w)$$

is a vector of such probabilities with size $$|X_t^w|.$$

Given the most recent history view in the treatment definition, some embodiments of the present invention estimate $\lambda_{y|Z_t}(t)$, $\forall 0 \leq t \leq T$ by using the same recent history formulation. This most recent history assumption has been explored before in multivariate point process as the proximal assumption and used in proximal graphical event model ("PGEM"); in a PGEM, the rate of occurrence of an event type depends only on whether or not its parents have occurred in the most recent history.

When the parents U of all nodes V are known, the log likelihood of a multivariate point process given a PGEM can be simplified to a function of counts and durations in the data and the conditional intensity rates of the PGEM:

$$\log L(D) = \sum_V \sum_u \left(-\lambda_{v|u} D(u) + N(v; u)\ln\left(\lambda_{v|u}\right)\right) \qquad (16)$$

With respect to equation 12, u is an instantiation of the parent of each variable v, N(v; u) is the number of times that X is observed in the dataset and that the condition u (from $2^{|U|}$ possible parental combinations) is true in the relevant preceding windows, and D(u) is the duration over the entire time period where the condition u is true. Formally, $$N(v; u) = \sum_{i=1}^{N} I(l_i = V) I_u^{w_v}(t_i) \text{ and } D(u) = \sum_{i=1}^{N+1} \int_{t_{i-1}}^{\tau_i} I_u^{w_v}(t)dt,$$

where $$I_u^{w_v}(t)$$

is an indicator for whether u is true at time t as a function of the relevant windows $w_v$.

Some embodiments of the present invention set z as the parent of y in a PGEM and then can estimate $$\lambda_{y|z}^w \text{ and } \lambda_{y|\bar{z}}^w,$$

which are intensities when z does and does not occur in the provided proximal window w. It is efficient since we only look at two events and only need to estimate intensity rates without learning windows. Once one has these two intensities, one can then look up $$\lambda_{y|Z_t}^k(t)$$

by finding the treatment $$Z_t^w$$

state at any query time t.

The idea of weighting samples is straightforward in the causal inference framework. If the treatment and control groups have different population in the event datasets, if the time units being in the treatment $$Z_t^w = 1$$

group is far fewer than the time units in the control group $$Z_t^w = 0,$$

some embodiments of the present invention need to upweight the time units in the treatment group and downweight those in the control group in order to get a better estimation. Some embodiments of the present invention use inverse probability of treatment weighting ("IPTW") as the weighting scheme, in order to adjust for covariates difference in population. Some embodiments of the present invention define the weight for the conditional intensity at time t in the treated $$Z_t^w = 1$$

group as $$\alpha_t = \frac{1}{P\left(Z_t^w = 1 | X_t^w\right)} = \frac{1}{e_t^*},$$

and for the control group $$Z_t^w = 0,$$

the weight becomes $$\alpha_t = \frac{1}{1 - P(Z_t^w = 1|H_t)} = \frac{1}{1 - e_t^*}.$$

Together, the weight for the outcome intensity rate at time t is defined as:

$$\alpha_t = \frac{Z_t^w}{e_t^*} + \frac{1 - Z_t^w}{1 - e_t^*} \qquad (17)$$

Some embodiments of the present invention propose an inverse probability weighting method for events. Some embodiments of the present invention estimate the propensity score and then estimate $w_t$ for all t. Then some embodiments of the present invention can choose a PGEM $M_y$ to predict $\lambda_{y|Z_t}(t)$, for both the factual outcome and counterfactual $\tilde{\lambda}_{y|Z_t}(t)$. Computing their empirical expectation would provide us an estimate for ATE, in the form:

$$ATE = E_{H_T}\left[\frac{1}{T}\int_{t=0}^{T}\alpha_t \cdot \lambda_y^1(t) - \frac{1}{T}\int_{t=0}^{T}\alpha_t \cdot \lambda_y^0(t)\right] \qquad (18)$$

With respect to equation 14, some embodiments of the present invention compare occurrence rates for all t in [0, T], which includes some epochs with treatment and some without. Since this is a continuous time setting, integration over time is not straightforward. Hence, some embodiments of the present invention propose to use a sampling procedure to compute the inner integral over time in equation 14 as $$\frac{1}{S}\sum_{k=1}^{S}\alpha_t \cdot \lambda_y^1(t) - \frac{1}{S}\sum_{k=1}^{S}\alpha_t \cdot \lambda_y^0(t),$$

where S is the desired number of epoch samples from $t_0=0$ to T.

One common issue with IPTW is that sometimes the propensity scores for some time unit t can get very close to 0, which indicates Z is extremely unlikely to occur in the window [t−w, t). This is likely to happen in a sampling procedure in a continuous timeline. Hence, the weights for those t become extremely large, causing unstable estimations. To combat this issue, the stabilized IPTW uses the marginal probability of treatment to counteract such an instability. It is formulated as $$\alpha_t = \frac{Z_t^w \cdot P(Z_t^w = 1)}{e_t^*} + \frac{(1 - Z_t^w) \cdot (1 - P(Z_t^w = 1))}{1 - e_t^*}.$$

Empirical Evaluation

Evaluating causal inference algorithms is more difficult than those for prediction tasks since observational datasets rarely contain the ground truth treatment effects. To this end, most experiments in the literature analyze causal models using a synthetic dataset where the ground truth is known. Some embodiments of the present invention begin by comparing the ATE estimation performance of our proposed IPTW methods on three synthetic event datasets, generated using different conditional intensity functions. Per standard practice in causal inference literature, we use root mean squared error ("RMSE") to measure the ATE accuracy performance of each method, along with its standard deviation.

There are no well established baselines that use event occurrence rate as the outcome in multivariate point processes for comparison. Since outcome $\lambda_y$ is not directly observable, simple adaptation of ATE from the i.i.d. case would not work. Hence, we propose two baseline scores from fitting parametric models to the intensity rates: CI (conditional intensity) and CIM, which consider a single parent event and a set, respectively. For the first baseline method, some embodiments of the present invention consider the association between a pair of events, (z, y) and assume that the intensity of y only depends on whether or not z has occurred at least once within a specified time window w. Hence, some embodiments of the present invention define a conditional intensity score to estimate the causal effect of z on y as $$CI(z, y) = \lambda_{y|z}^w - \lambda_{y|\bar{z}}^w.$$

Some embodiments of the present invention extend this definition to handle the fact that y may depend on the historical arrival of a set of events instead of just a single z. This means that there are possibly $2^{|X+1|}$ conditional intensity rates and need to aggregate the score for z given all other conditions of the parent set. Formally, $$CI(z, y) = \text{mean}\left(\lambda_{y|z,x}^w - \lambda_{y|\bar{z},x}^w\right),$$

when z is a parent of y and otherwise the score is 0.

Some embodiments of the present invention compare CI scores with three versions of ATE estimation based on one proposed IPTW methods. First, some embodiments of the present invention compute ATE with no weighting as per equation 9; this approach is abbreviated as IP-NW. Second, some embodiments of the present invention use the proposed IPTW with non-stable weight ("IP-NS") with weights as per equation 13. Last, some embodiments of the present invention use IPTW with stable weight ("IP-Stable") to compute ATE.

Some embodiments of the present invention, first generate event data that adheres to the proximal assumption for the intensity functions. Some embodiments of the present invention generate 3 models with different numbers of events, randomly generated graph structures among events, fixed window size of w=30, T=2000, and random intensities between 0.1 and 0.4. Some embodiments of the present invention use the data and the generated model to obtain the true estimation of marginalized lambda $\lambda_{y|Z_t(t)}$ at chosen times is and hence can compute the ground truth ATE. Some embodiments of the present invention observe that the sample size S of t ($10^3$ to $10^5$) in the ATE estimation does not impact the results much, some embodiments of the present invention use sample size S=$10^3$ for all the experiments. Some embodiments of the present invention depict three synthetic PGEM datasets, non-weighted IP-NW performs worse than CI scores when window size W is small but better with large windows. IP-NS with non-stable weight can lead to non-stable estimation. IP-Stable's RMSE is consistently the smallest across datasets and window sizes, sometimes with 6 times reduction in error from CI scores.

Some embodiments of the present invention test approaches on synthetic multivariate Hawkes process datasets using an existing toolbox. Some embodiments of the present invention generate 3 datasets with 30, 40, and 50 event labels, with ground truth window w=15. Some embodiments of the present invention use a fixed base rate 0.016 and each parental event leads to additive spike of 0.06 to the base rate, with an exponential decay rate 0.15. Some embodiments of the present invention generate event streams with T=2000. For estimating the counterfactual rate, $\hat{\lambda}_{y|Z_t}(t)$, to compute ATE in the case where there is no treatment event over [t−w, t), some embodiments of the present invention introduce a counterfactual treatment event at time t−w. The bottom section of Table 3 shows the RMSE results of different algorithms. IP-NW out performs CI scores in all cases. IP-Stable shows the lowest RMSE among all methods, generally achieving 3 to 10 times better accuracy. In addition, the performance of IP-NW and IP-Stable are relatively stable with respect to the window sizes, with minimal changes.

Some embodiments of the present invention also generate a synthetic hybrid dataset that combines the idea of proximal graphical event models and additive excitation similar to Hawkes processes with a constant kernel. IP-NW outperforms CI scores in all cases but one, and IP-Stable shows the lowest RMSE in all but two cases.

Some embodiments of the present invention test the proposed methods on the diabetes dataset—a real world dataset which we process into events for meals, exercise activity, insulin dosage and changes in blood glucose measurements for 70 diabetes patients. Some embodiments of the present invention treat the assessments in as the ground truth, where an expert provided 11 pairs such that a cause label is more likely to make the effect label occur. Since the assessments are only partial and do not provide the true ATE, we use hits@K among highest absolute estimated ATE values to measure performance in this experiment, which is a popular metric for information retrieval. Specifically, some embodiments of the present invention determine how many of the 11 pairs are recovered by a method's top K absolute scores. The dataset is split into 50%/50% training/test sets, and optimal window setting is determined on the training set, which is then deployed in the test set for evaluation. w={0.1, 0.3, 0.5, 1} days for all models were considered during training.

Conclusion

Some embodiments of the present invention propose a framework for pairwise event causality in a multivariate point process. Some embodiments of the present invention formalize the problem similar to Rubin's causal inference framework, and propose definitions of treatment, outcome, and propensity scores. Some embodiments of the present invention estimate the average treatment effect using the proposed propensity score weighting procedure, demonstrating that it achieves the best performance against baselines. Some embodiments of the present invention work bridges causal inference with multivariate point processes, showing promising performance in estimating pair-wise causal relationships among events. Future work could study efficient estimation approaches of ATE without sampling and the more general problem setting as defined with different history representations. It would also be interesting to study other estimands, such as areas under intensity rate curves over time.

Ethical Statement

Causal inference is one of the fundamental research techniques to infer how two variables, in this case two event variables, relate to each other causally. If one considers event stream datasets, which this paper focuses on, the research could be considered as primarily a machine learning technique to process event stream datasets. There are many potential applications of this work, such as modeling news events, user behavior patterns over time, and so on. However, impacts on potential downstream applications are difficult to speculate upon further, so we focus on the broader impacts from algorithmic and theoretical points of view only.

The main contribution of this paper advances the modeling and understanding of event pair relations, via the causal inference framework. We are able to estimate the causal impact between two events more accurately, hence its application should be broad when the domain fits the inherent assumptions in this framework. This improved understanding should make event stream modeling to fit more closely to the reality. We believe this work is a potentially important step to reduce spurious correlation, biases, and misunderstanding in practice. However, one has to be careful in applying the proposed models to any application, especially around verifying the assumptions. Failure to do so could result in misunderstanding and mis-identifying wrong causes, many of which could result in incorrect conclusions. One must take further steps to validate the results carefully, to avoid serious downstream impacts.

Figure 4:
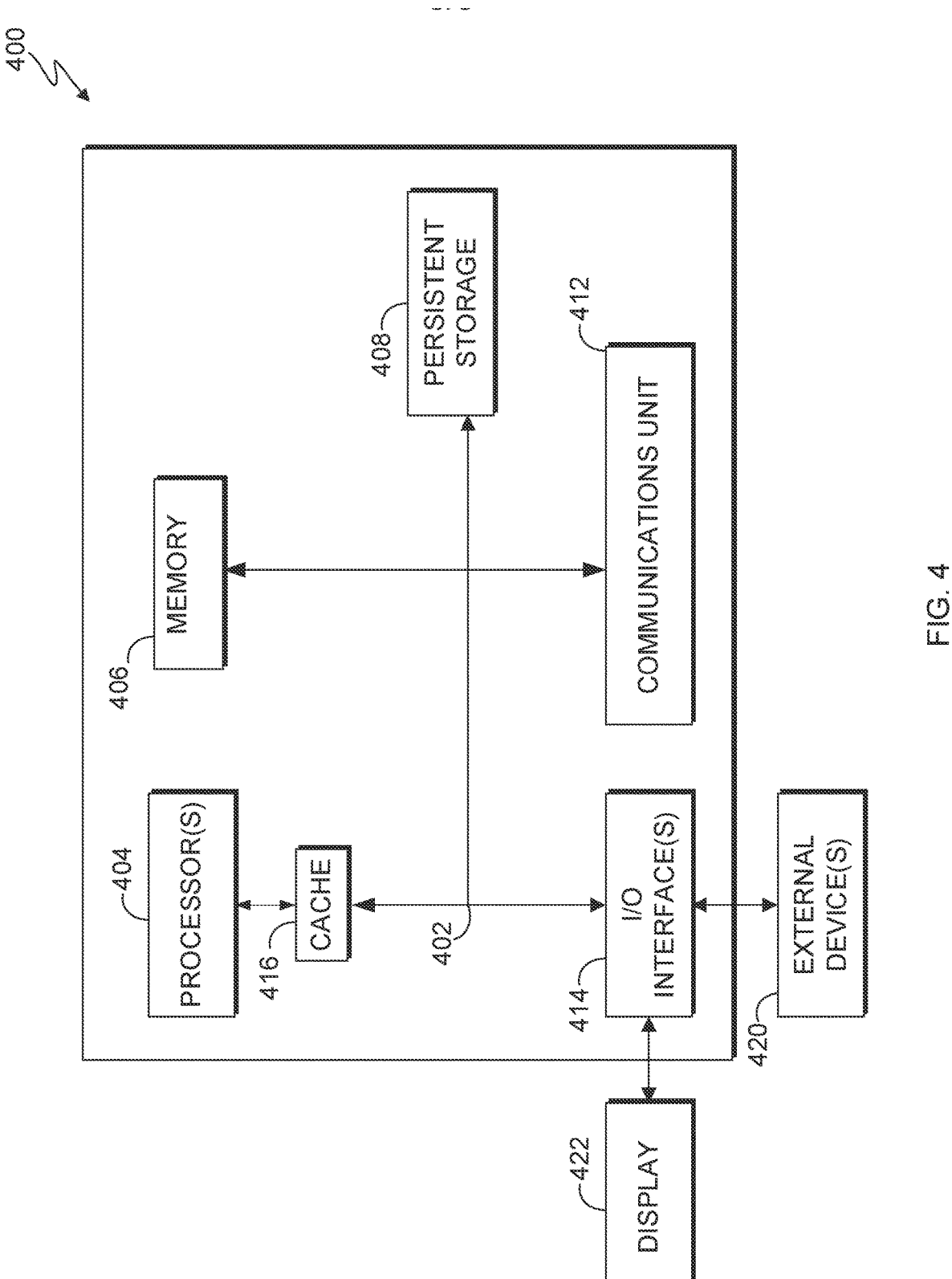
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Average treatment effect program 110 (not shown) may be stored in persistent storage 408 and in memory 606 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Average treatment effect program 110 may be downloaded to persistent storage 508 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., average treatment effect program 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
identifying a plurality of data variables within a stream of a multivariate event dataset;
formalizing a causal inference between a first identified data variable associated with historical occurrences and a second identified data variable associated with a different occurrence within the multivariate event dataset by determining a causal connection strength for the first identified data variable and the second identified data variable;
training a data model with the multivariate event dataset based on the causal inference, wherein the data model estimates a plurality of treatment effects between the first identified data variable and the second identified data variable;

calculating an inverse propensity score for the data model based on a type of identified variable, a predetermined time associated with the identified variable, and the causal connection strength between the first identified data variable and the second identified data variable;
validating the inverse propensity score by splitting the multivariate event dataset into a training data set based on an identified optimal time window;
responsive to the inverse propensity score being validated, optimizing the data model by strengthening the causal inference between the first identified data variable and the second identified data variable;
responsive to the inverse propensity score failing validation, optimizing the data model by removing the causal inference between the first identified data variable and the second identified data variable.

2. The computer-implemented method of claim 1, wherein identifying the plurality of data variables comprises:
analyzing the multivariate event dataset for a data variable based on a plurality of indicative markers;
identifying at least two analyzed data variables based on an average treatment effect and a propensity value using a plurality of scanning devices; and
retrieving the at least two analyzed data variables based on a positive match percentage that meets or exceeds a predetermined threshold of change associated with the plurality of indicative markers, wherein a retrieved data variable assists in formalizing the causal inference within the multivariate event dataset.

3. The computer-implemented method of claim 1, wherein formalizing the causal inference between the first identified data variable and the second identified data variable comprises:
generating a data structure that plots each identified data variable associated with the multivariate event dataset within an estimated data model;
predicting outcomes associated with collected data using the generated data structure by estimating a plurality of treatment effects between a treatment variable associated with historical occurrences and an outcome variable associated with a different occurrence; and
formalizing the causal inference between the first identified data variable and the second identified data variable based on an estimation of the plurality of treatment effects between the treatment variable and the outcome variable.

4. The computer-implemented method of claim 1, wherein generating the data model comprises calculating a difference between the first identified data variable and the second identified data variable at a plurality of predetermined times.

5. The computer-implemented method of claim 1, wherein calculating the inverse propensity score for the data model comprises modifying the first identified data variable and the second identified data variable, wherein the validating may be changing a type of identified variable, the predetermined time associated with the identified variable, and a causal connection strength between the identified plurality of data variables.

6. The computer-implemented method of claim 1, further comprising validating the inverse propensity score based on a derivation of an equivalent propensity score.

7. The computer-implemented method of claim 6, further comprising automatically terminating an operation of the data model in response to the inverse propensity score meeting or exceeding a predetermined threshold.

8. The computer-implemented method of claim 1, further comprising:

generating a second data model for the multivariate event dataset based on the causal inference of the first identified data variable and the second identified data variable; and calculating an inverse propensity score for the second data model based on a plurality of factors.

9. A computer program product comprising:

one or more computer readable storage media and program instructions stored on the one or more computer readable storage media, the program instructions comprising:

program instructions to identify a plurality of data variables within a stream of a multivariate event dataset;

program instructions to formalize a causal inference between a first identified data variable associated with historical occurrences and a second identified data variable associated with a different occurrence within the multivariate event dataset by determining a causal connection strength for the first identified data variable and the second identified data variable;

program instructions to train a data model with the multivariate event dataset based on the causal inference, wherein the data model estimates a plurality of treatment effects between the first identified data variable and the second identified data variable;

program instructions to calculate an inverse propensity score for the data model based on a type of identified variable, a predetermined time associated with the identified variable, and the causal connection strength between the first identified data variable and the second identified data variable;

program instructions to validate the inverse propensity score by splitting the multivariate event dataset into a training data set based on an identified optimal time window;

program instructions to, responsive to the inverse propensity score being validated, optimize the data model by strengthening the causal inference between the first identified data variable and the second identified data variable; and program instructions to, responsive to the inverse propensity score failing validation, optimize the data model by removing the causal inference between the first identified data variable and the second identified data variable.

10. The computer program product of claim 9, wherein the program instructions to identify the plurality of data variables comprise:

program instructions to analyze the multivariate event dataset for a data variable based on a plurality of indicative markers;

program instructions to identify at least two analyzed data variables based on an average treatment effect and a propensity value using a plurality of scanning devices; and program instructions to retrieve the at least two analyzed data variables based on a positive match percentage that meets or exceeds a predetermined threshold of change associated with the plurality of indicative markers, wherein a retrieved data variable assists in formalizing the causal inference within the multivariate event dataset.

11. The computer program product of claim 9, wherein the program instructions to formalize the causal inference between the first identified data variable and the second identified data variable comprise:

program instructions to generating a data structure that plots each identified data variable associated with the multivariate event dataset within an estimated data model;

program instructions to predict outcomes associated with collected data using the data structure by estimating a plurality of treatment effects between a treatment variable associated with historical occurrences and an outcome variable associated with a different occurrence; and program instructions to formalize the causal inference between the first identified data variable and the second identified data variable based on an estimation of the plurality of treatment effects between the treatment variable and the outcome variable.

12. The computer program product of claim 9, wherein the program instructions to generate the data model comprise:

program instructions to calculate a difference between the first identified data variable and the second identified data variable at a plurality of predetermined times.

13. The computer program product of claim 9, wherein the program instructions to calculate the inverse propensity score for the data model comprise:

program instructions to modify the first identified data variable and the second identified data variable, wherein the modifying comprises changing a type of identified variable, the predetermined time associated with the identified variable, and a causal connection strength between the identified plurality of data variables.

14. The computer program product of claim 9, wherein the program instructions stored on the one or more computer readable storage media further comprise:

program instructions to validate the inverse propensity score based on a derivation of an equivalent propensity score.

15. The computer program product of claim 14, wherein the program instructions stored on the one or more computer readable storage media further comprise:

program instructions to automatically terminate an operation of the data model in response to the inverse propensity score meeting or exceeding a predetermined threshold.

16. A computer system comprising:

one or more computer processors;

one or more computer readable storage media; and program instructions stored on the one or more computer readable storage media for execution by at least one of the one or more computer processors, the program instructions comprising:

program instructions to identify a plurality of data variables within a stream of a multivariate event dataset;

program instructions to formalize a causal inference between a first identified data variable associated with historical occurrences and a second identified data variable associated with a different occurrence within the multivariate event dataset by determining a causal connection strength for the first identified data variable and the second identified data variable;

program instructions to train a data model with the multivariate event dataset based on the causal inference, wherein the data model estimates a plurality of treatment effects between the first identified data variable and the second identified data variable;

program instructions to calculate an inverse propensity score for the data model based on a type of identified variable, a predetermined time associated with the identified variable, and the causal connection strength between the first identified data variable and the second identified data variable program instructions to validate the inverse propensity score by splitting the multivariate event dataset into a training data set based on an identified optimal time window;

program instructions to, responsive to the inverse propensity score being validated, optimize the data model by strengthening the causal inference between the first identified data variable and the second identified data variable; and program instructions to, responsive to the inverse propensity score failing validation, optimize the data model by removing the causal inference between the first identified data variable and the second identified data variable.

17. The computer system of claim 16, wherein the program instructions to identify the plurality of data variables comprise:

program instructions to analyze the multivariate event dataset for a data variable based on a plurality of indicative markers;

program instructions to identify at least two analyzed data variables based on an average treatment effect and a propensity value using a plurality of scanning devices; and program instructions to retrieve the at least two analyzed data variables based on a positive match percentage that meets or exceeds a predetermined threshold of change associated with the plurality of indicative markers, wherein a retrieved data variable assists in formalizing the causal inference within the multivariate event dataset.

18. The computer system of claim 16, wherein the program instructions to formalize the causal inference between the first identified data variable and the second identified data variable comprise:

program instructions to generating a data structure that plots each identified data variable associated with the multivariate event dataset within an estimated data model;

program instructions to predict outcomes associated with collected data using the data structure by estimating a plurality of treatment effects between a treatment variable associated with historical occurrences and an outcome variable associated with a different occurrence; and program instructions to formalize the causal inference between the first identified data variable and the second identified data variable based on an estimation of the plurality of treatment effects between the treatment variable and the outcome variable.

19. The computer system of claim 16, wherein the program instructions to generate the data model comprise:

program instructions to calculate a difference between the first identified data variable and the second identified data variable at a plurality of predetermined times.

20. The computer system of claim 16, wherein the program instructions to calculate the inverse propensity score for the data model comprise:

program instructions to modify the at least two identified variables, wherein the modifying comprises changing a type of identified variable, the predetermined time associated with the identified variable, and a causal connection strength between the identified plurality of data variables.

*    *    *    *    *